United States Patent [19]

Rau et al.

[11] Patent Number: 4,816,331
[45] Date of Patent: Mar. 28, 1989

[54] ELECTROSTATIC COATING OF PULTRUDED ARTICLES

[75] Inventors: Robert B. Rau, Aurora, Ohio; Thomas C. Wagner, Pittsburgh, Pa.

[73] Assignee: PPG Industries, Inc., Pittsburgh, Pa.

[21] Appl. No.: 220

[22] Filed: Jan. 2, 1987

[51] Int. Cl.$^4$ ............................ B32B 5/08; B05D 1/06
[52] U.S. Cl. ...................................... 428/294; 427/32; 427/358; 427/434.6
[58] Field of Search ...................... 428/373, 374, 294; 264/136, 137; 427/32, 358, 434.6

[56] References Cited

U.S. PATENT DOCUMENTS

| | | | |
|---|---|---|---|
| 3,718,181 | 2/1973 | Reilly et al. | 165/180 |
| 4,207,129 | 6/1980 | Tadewald | 156/242 |
| 4,258,101 | 3/1981 | Hornbeck | 428/373 X |

FOREIGN PATENT DOCUMENTS

| | | | |
|---|---|---|---|
| 59-49913 | 3/1984 | Japan . | |
| 2082112 | 3/1982 | United Kingdom | 264/136 |

Primary Examiner—Evan Lawrence
Attorney, Agent, or Firm—Donna L. Seidel

[57] ABSTRACT

Pultruded plastic substrates are produced which contain fine conductive elements of metal wires or conductive rovings. These conductive element containing pultruded articles are electrostatically coated.

18 Claims, 1 Drawing Sheet

ELECTROSTATIC COATING OF PULTRUDED ARTICLES

BACKGROUND OF THE INVENTION

Pultrusion can be defined as a process for producing reinforced plastic geometric shapes in a continuous length by pulling a resin impregnated fiber reinforcement through a forming and curing die. Pultrusion dates back to the early 1950's when it was initially used to form round bar stock for the fishing rod industry. The systems, method and apparatus for forming pultruded shapes remained at this level for several years until the late 1960's when improvements allowed manufacturers to form various structural shapes used in a number of applications including corrosive and weather resistant ladders, gratings, hand rails, hoods, walkway supports, and structural elements for buildings such as greenhouses and the like.

However, fiber glass reinforced plastics (FGRP) which are formed by pultrusion have proved difficult to coat. Electrostatic coating techniques have not been employed to coat pultruded filament reinforced plastics (FRP) as these products are usually manufactured from non-conductive components resulting in non-conductive products. Conductive components such as conductive fabrics or conducting resin systems may be used to impart conductivity to the pultruded articles but the incorporation of these components carries the disadvantages of high cost and/or an undesirable increase in the thermal conductvity of the profile. High thermal conductivity is extremely undesirable in products used in architectural applications such as window frame parts.

It is an object of the instant invention to increase the receptivity of the FGRP to electrostatically applied coatings by incorporating conductive wires or rovings into the FGRP without significantly affecting the thermal conductivity of the FEGRP profile.

It is a further object of the present invention to coat filament or fiber glass reinforced plastics containing conductive elements by an electrostatic painting process.

SUMMARY OF THE INVENTION

The instant invention relates to a conductive pultruded substrate and to an electrostatic coating process for coating the pultruded substrate. Superior coatings have been produced on pultruded lineals through the use of fiber reinforced plastic products that comprise a fiber reinforced plastic (FRP) which additionally contains conductive metal wires or conductive glass rovings. These conductors can be used singly or in multiples to provide a ground path which is necessary for the electrostatic coating process.

DETAILED DESCRIPTION OF THE INVENTION

Figure 1:
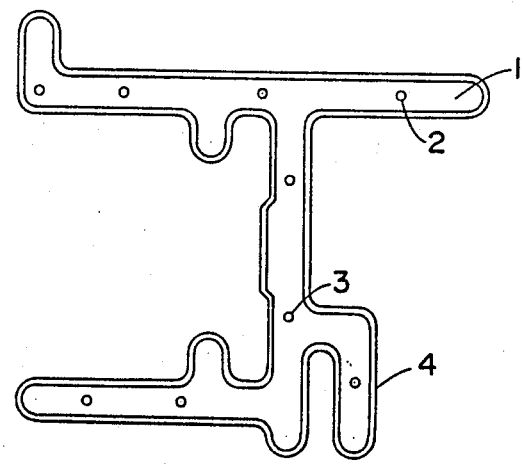
FIG. 1 is a cross-sectional view of an electrostatically coated pultruded substrate, an exemplary pultruded window sash, in accordance with the present invention.

The present invention is concerned with a conductive pultruded substrate and a process for electrostatically coating this substrate. The pultruded substrate contains non-conductive elements, namely polymeric resins and filamentary materials, and conductive elements. The conductive elements are employed in the pultruded substrate provide a ground path for the subsequent electrostatic coating while minimizing any undesirable increase in the thermal conductivity of the pultruded substrate profile.

Examples of polymeric resins which may be employed in the production of the pultruded substrate may be either thermosetting or thermoplastic in nature and may include, but are not limited to, thermosetting resins such as amino compounds, including urea-formaldehyde, malamine-formaldehyde, aniline-formaldehyde, ethylene urea-formaldehyde, benzoquanamine-formaldehyde, phenol-formaldehyde, and epoxy resin, or thermoplastic polymers such as polyesters, polyethylene, polypropylene, polystyrene, polyvinylchloride, polyphenylene oxide, polysulfones, polyaryl ethers, polyaryl sulfones, polycarbonates, polyurethane, polyacrylates such as polymethyl methacrylate, polymethyl acrylate and polyacetyls.

Various non-conductive filamentary materials may be used in producing the fiber reinforced products of the invention such as glass and synthetic polymer fibers such as nylon, orlon, rayon, dacron and the like. Natural fibers such as cotton, linen, wool and the like may also be utilized. The preferred filament component is glass fiber in the many forms available commercially. These filamentary materials can be employed in various physical forms. The filaments of the invention include fibers in any of a number of forms. Thus, filaments or fibers can be used in "continuous" or chopped form. Continuous filaments can be used as roving, which is defined as one or more "ends" or groups of filaments arranged in essentially parallel disposition. Such parallel orientation provides longitudinal strength in molded plastic articles. Woven roving may be employed where strength is also desired in a transverse direction in molded plastic articles. Continuous filaments can be used in the form of thread for strength in the longitudinal direction and in the form of cloth where strength is required in both longitudinal and transverse direction. Chopped or continuous filaments can be used in the form of mats to give strength in the longitudinal and transverse directions. Typical pultruded articles range from 0.05 to 1 inch (about 0.13 to 2.54 centimeters) in thickness.

The conductive materials which must necessarily be utilized are either (1) fine metal wires such as aluminum wires ranging in diameter from 0.003 to 0.030 inch (about 0.076 to 0.76 millimeters), most preferably 0.010 inch (0.25 millimeter) diameter or (2) conductive glass roving such as nickel plated rovings having a yield ranging from 50 to 700 yards (about 45.7 to 640.1 meters) per pound, most preferably 100 to 150 yards (about 91.4 to 137.2 meters) per pound. Surprisingly, the utilization of either the fine metal wires or the conductive rovings in pultruded FRP produces a suitable ground path in the substrate for electrostatic coatings while minimizing the undesirable effects of increased thermal conductivity in the substrate.

Conductive fine metal wires which may be utilized in the instant invention include, but are not limited to, aluminum, copper, and steel wires. Conductive rovings which may be utilized in the instant invention include, but are not limited to, conductive rovings such as graphite rovings and glass rovings having conductive coatings selected from nickel, palladium or carbon. Preferred metal wires for use in the invention are aluminum wires, and preferred conductive glass rovings are nickel plated glass rovings.

It has been discovered that the conductive pultruded products which are utilized in the instant invention may be electrostatically coated if one of the conductive elements is within four inches of the surface to be coated. Although only one conductive element may be utlized in the final product, the use of a plurality of conductive elements is preferred because the use of a greater number of conductive elements improves the efficiency of the electrostatic painting process on the pultruded article. In instances when the pultruded article is extremely small, the use of one conductive element is sufficient to provide the suitable grounding effect for the electrostatic coating. As the pultruded articles increase in size, additional conductive elements must necessarily be utilized to promote uniform coatings on all surfaces. It is preferred to have conductive elements utilized in the pultruded articles at approximately 0.1 to 1 inch (about 0.25 to 2.54 centimeters) linear width intervals, most preferably every 0.25 to 0.75 inch (about 0.6 to 1.9 centimeters). The conductive elements may be utilized positionally below the surface of the substrate at a location near the center of the substrate, typically within the middle two thirds of the substrate. It is desirable to include approximately between one and eight running conductive elements per inch width of substrate.

A typical pultrusion process for production of the conductive substrate of the instant invention is as follows.

The filament reinforced products of the invention are produced by passing both the conductive and non-conductive filament components, preferably in a continuous form such as a filament, roving or thread, into a bath or vessel of the liquid resin component in which the filament component is saturated with the resin component. Next, the resin saturated filament components are passed through one or more suitable orifices having a smaller dimension than the composite of the resin saturated filament components. The orifice functions to squeeze out the excess liquid resin to maintain the ratio of the resin to filaments constant in the process and to compress the resin-filament composite to the proper dimension. Thereafter, the resin-filament composite may optionally be passed through a preheater so that the composite is cured more rapidly in subsequent steps of the process. The resulting preheated resin-filament composite is passed through an extrusion die which functions to shape, heat and finally cure the resin component. The cured resin filament composite is pulled as a continuous shape from the pultrusion die with the aid of a suitable puller mechanism, commonly a pair of automatic pulling devices. The cured product can be cut into suitable length in a suitable cutting device.

The filament component, in suitable form such as individual fibers, roving or mat, is saturated with the resin component at atmospheric temperature, although higher and lower temperatures can be used. The resin component is generally introduced to the bath in normally liquid form with or without the aid of a diluent. Reactive diluents can be used if necessary to achieve the desired viscosity and volatility to properly saturate the filament component. In the bath, sufficient resin component becomes saturaed on the filament component to provide an excess of resin component.

In the resin bath, more resin component is permitted to saturate the filament component than is desired in the final product to insure there is always sufficient resin component present. Then the desired ratio of resin to filament components is achieved by squeezing out the excess resin as it passes through a suitable orifice or die member. One or more orifices or dies can be used in series to accomplish this step. The proportion of resin in the resin-filament composite leaving the last orifice or die is about 30 to about 50 weight percent resin based on the weight of the resin-filament composite.

The resin-composite may be preheated if desired in any suitable heater, such as a dielectric heater, so it cures more rapidly in subsequent steps. The temperature in the preheater can range anywhere from about 30° to 100° C.

The pultrusion of the resin-filament composite is accomplished in a forming and heating device such as described in U.S. Pat. No. 3,244,784, the disclosure of which is incorporated herein by reference. The function of the forming die, also known in this art as a pultrusion die, is to simultaneously form, heat and cure the resin component. If desired, the resin can be partially cured in situations where it is desired to hold the final cure to a subsequent step.

The filament component passes in a continuous manner from the preceding described steps. This motion is sustained by a pulling device which functions to continuously pull on the cured resin-filament composite as it proceeds from the exit end of the curing die. Suitable pulling mechanisms are detailed in U.S. Pat. No. 3,244,784. Generally, the filament components are pulled from the die at a rate of about 1 to 20 feet (about 0.3 to 6.1 meters) per minute.

The cured linear resin filament composite emanating from the puller mechanism is then electrostatically painted utilizing conventional electrostatic coating techniques which are known in the art. Optionally, individually cut sections of the conductive substrates may be separately electrostatically coated.

Although the conductive elements can be directly physically grounded during the electrostatic coating process, the conductive elements do not necessarily have to be directly physically grounded to enable the electrostatic coating to take place. Suitable ground of the pultruded articles can be accomplished simply by grounding the resin surfaces within a few inches of the conductor to provide the necessary ground effect for electrostatic coating or painting.

As shown in FIG. 1, the pultruded resin substrate 1 containing non-conductive reinforcing fibers 2 and conductive elements 3 is electrostatically coated with a typical paint coating 4 on all sides of the substrate. FIG. 1 displays a pultruded sash bar substrate 1 which exemplifies an unusual shape which can easily be formed by pultrusion techniques but which would be difficult to uniformly coat by conventional coating processes.

We claim:

1. An electrostatically coated fiber reinforced pultruded plastic substrate comprised of a resin, non-conductive reinforcing filament elements and at least one conductive element running lengthwise within four inches of the surface to be coated.

2. The substrate as defined in claim 1, wherein said at least one conductive element is a metal wire.

3. The substrate as defined in claim 2, wherein said at least one conductive element ranges in diameter from 0.003 to 0.030 inch (about 0.076 to 0.76 millimeters).

4. The substrate as defined in claim 2, wherein said at least one metal wire is aluminum, copper, or steel.

5. The substrate as defined in claim 1, wherein said at least one conductive element is an electrically conductive roving.

6. The substrate as defined in claim 5, wherein said at least one electrically conductive roving is a glass roving coated with nickel, palladium or carbon having a yield ranging from 50 to 700 yards (about 45.7 to 640.1 meters) per pound.

7. The substrate as defined in claim 1, wherein a plurality of conductive elements are utilized at 0.1 to 1 inch (about 0.25 to 2.54 centimeters) linear width intervals of the plastic substrate.

8. The substrate as defined in claim 1, wherein the non-conductive elements are fiber glass.

9. The substrate as defined in claim 1, wherein the resin is a polyester.

10. A process for coating a fiber reinforced plastic substrate comprising the steps of:
  a. pultruding a substrate comprised of a resin, non-conductive reinforcing filament elements and at least one conductive element running lengthwise within four inches of the surface to be coated; and
  b. electrostatically coating said substrate.

11. The process as defined in claim 10, wherein said at least one conductive element is a metal wire.

12. The process as defined in claim 11, wherein said at least one conductive element ranges in diameter from 0.003 to 0.030 inch (about 0.076 to 0.76 millimeter).

13. The process as defined in claim 11, wherein said metal wire is aluminum, copper or steel.

14. The process as defined in claim 10, wherein said at least one conductive element is an electrically conductive roving.

15. The process as defined in claim 14, wherein said conductive roving is a glass roving coated with nickel, palladium or carbon.

16. The process as defined in claim 10, wherein a plurality of conductive elements are utilized at 0.1 to 1 inch (about 0.25 to 2.54 centimeters) linear width intervals of the plastic substrate.

17. The process as defined in claim 10, wherein the non-conductive elements are fiber glass.

18. The process as defined in claim 10, wherein the resin is a polyester.

* * * * *